United States Patent [19]

Shipley

[11] Patent Number: 4,967,195
[45] Date of Patent: Oct. 30, 1990

[54] HOSPITAL SIGNALING AND COMMUNICATIONS SYSTEM

[76] Inventor: Robert T. Shipley, 6641 Glen Oaks Way, Oakland, Calif. 94611

[21] Appl. No.: 861,090

[22] Filed: May 8, 1986

[51] Int. Cl.$^5$ ............................................. H04Q 1/00
[52] U.S. Cl. ..................... 340/825.520; 340/825.08; 340/286.06; 340/286.07
[58] Field of Search .................. 340/825.52, 825.08, 340/825.07, 311.1, 573, 286 R, 286.06, 286.07; 379/37, 94, 106, 172, 173; 370/85, 90, 96, 67, 94, 58, 60, 85.1, 94.1

[56] References Cited

U.S. PATENT DOCUMENTS

| | | | |
|---|---|---|---|
| 3,413,088 | 10/1975 | Sears | 340/286 |
| 3,631,447 | 12/1971 | Solat et al. | 307/142 |
| 3,652,800 | 3/1972 | Dooley | 370/67 |
| 3,668,682 | 11/1970 | Barbee et al. | 340/286 |
| 3,742,141 | 6/1973 | Duncan et al. | 379/106 |
| 3,767,859 | 10/1973 | Doering et al. | 379/106 |
| 3,872,440 | 3/1975 | Benz et al. | 455/88 |
| 3,946,159 | 3/1976 | Fay | 379/106 |
| 4,237,344 | 12/1980 | Moore | 379/37 |
| 4,429,299 | 1/1984 | Kabat | 340/825.52 |
| 4,455,548 | 6/1984 | Burnett | 340/573 |
| 4,627,047 | 12/1986 | Pitvoda | 370/58 |

Primary Examiner—Donald J. Yusko
Assistant Examiner—Edwin C. Holloway, III
Attorney, Agent, or Firm—Flehr, Hohbach, Test, Albritton & Herbert

[57] ABSTRACT

Computer controlled, multiplexed hospital signaling and communications system. All station functions are controlled by a computer in a central station which continuously interrogates the other stations to verify that the system is functioning properly and to determine what actions are to be taken. The system includes a plurality of buses connected to the master station, with a plurality of remote stations with peripheral devices connected to each of the buses. A plurality of master stations can communicate with any of the remote stations on any of the buses. Time domain multiplexing is employed in the transmission of both data and audio signals in the system.

31 Claims, 14 Drawing Sheets

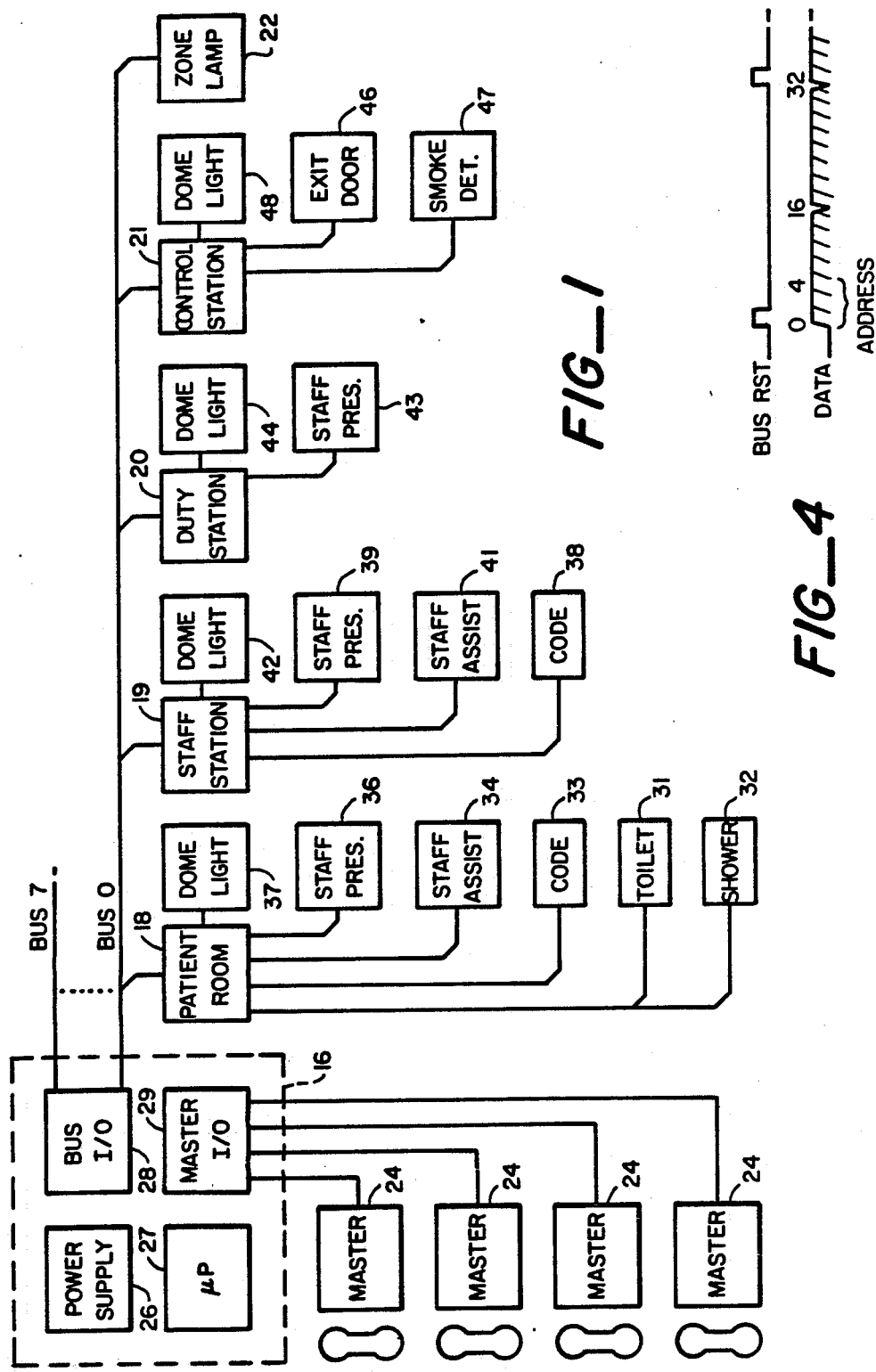

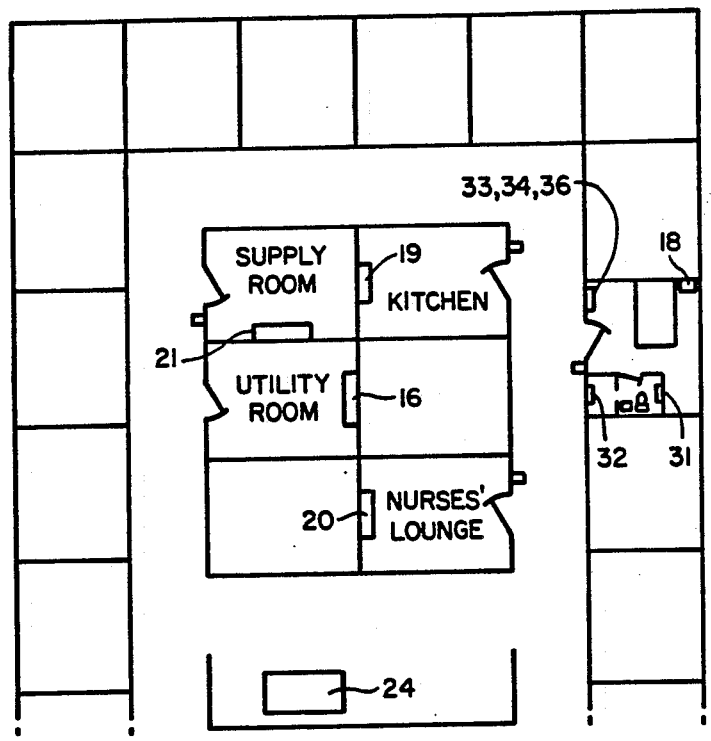
FIG_2
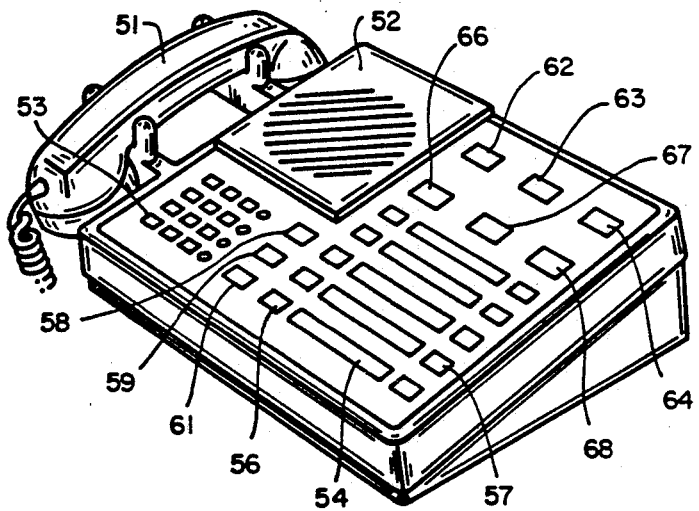
FIG_3

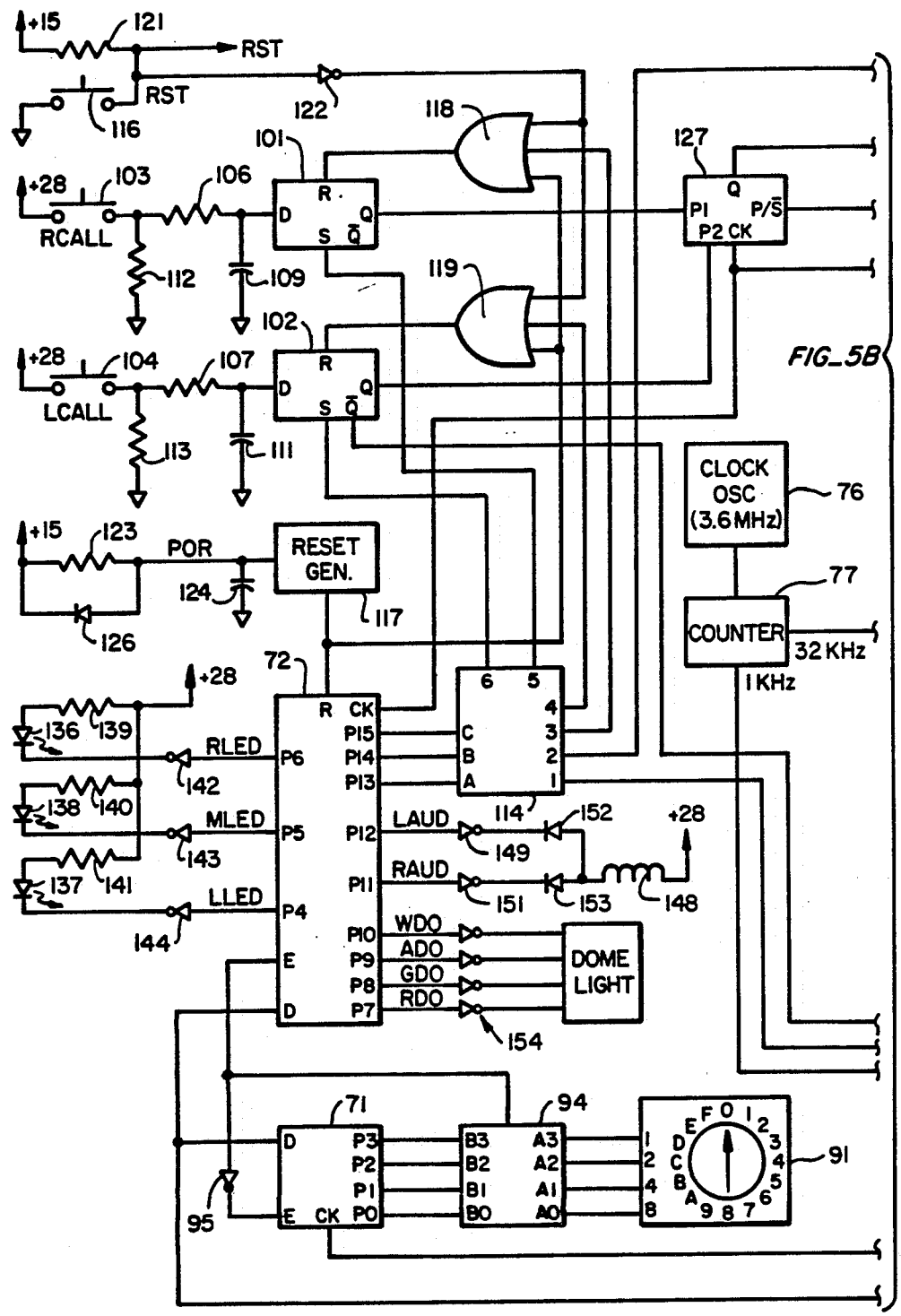
FIG_5A

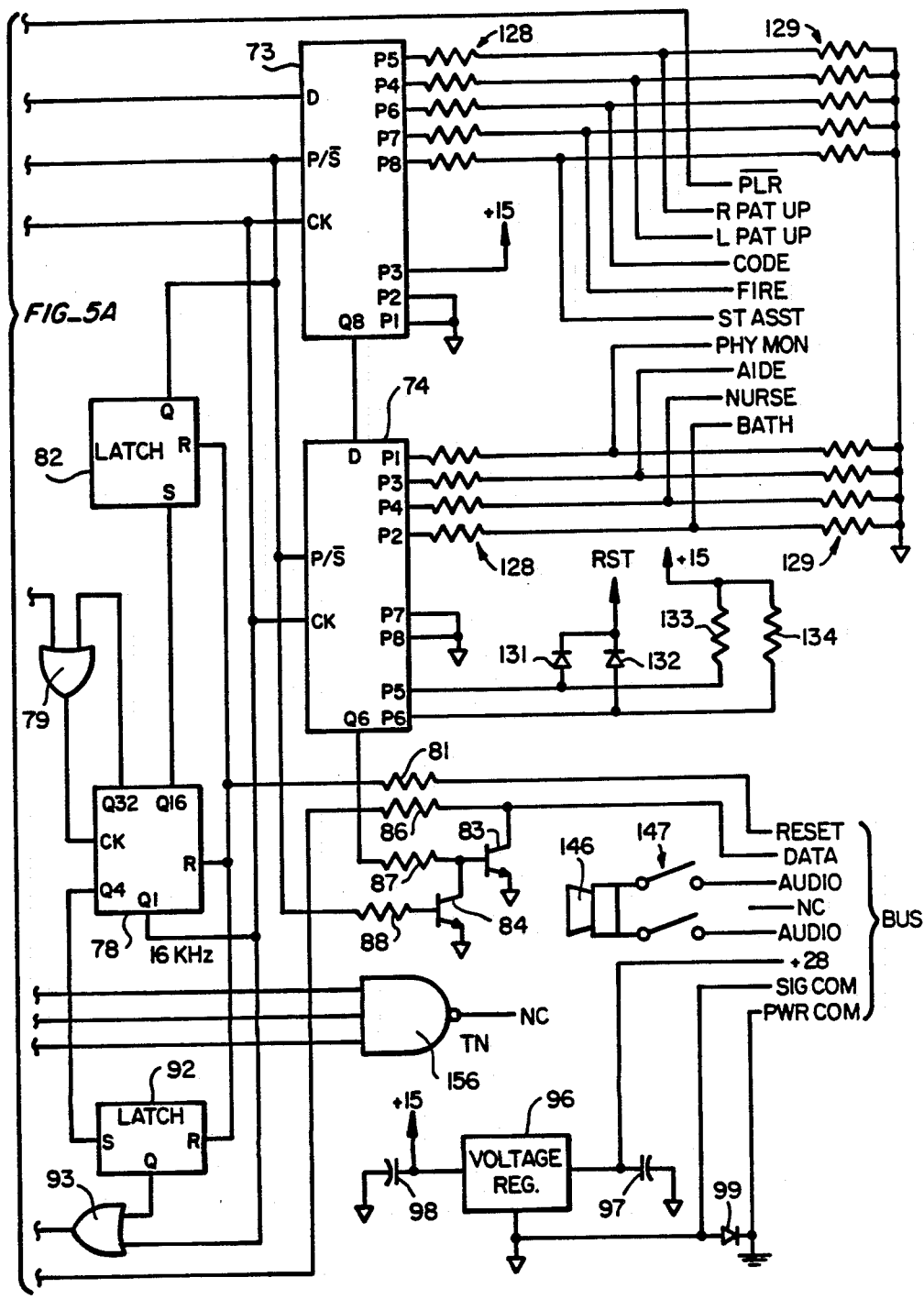
FIG_5A
FIG_5B

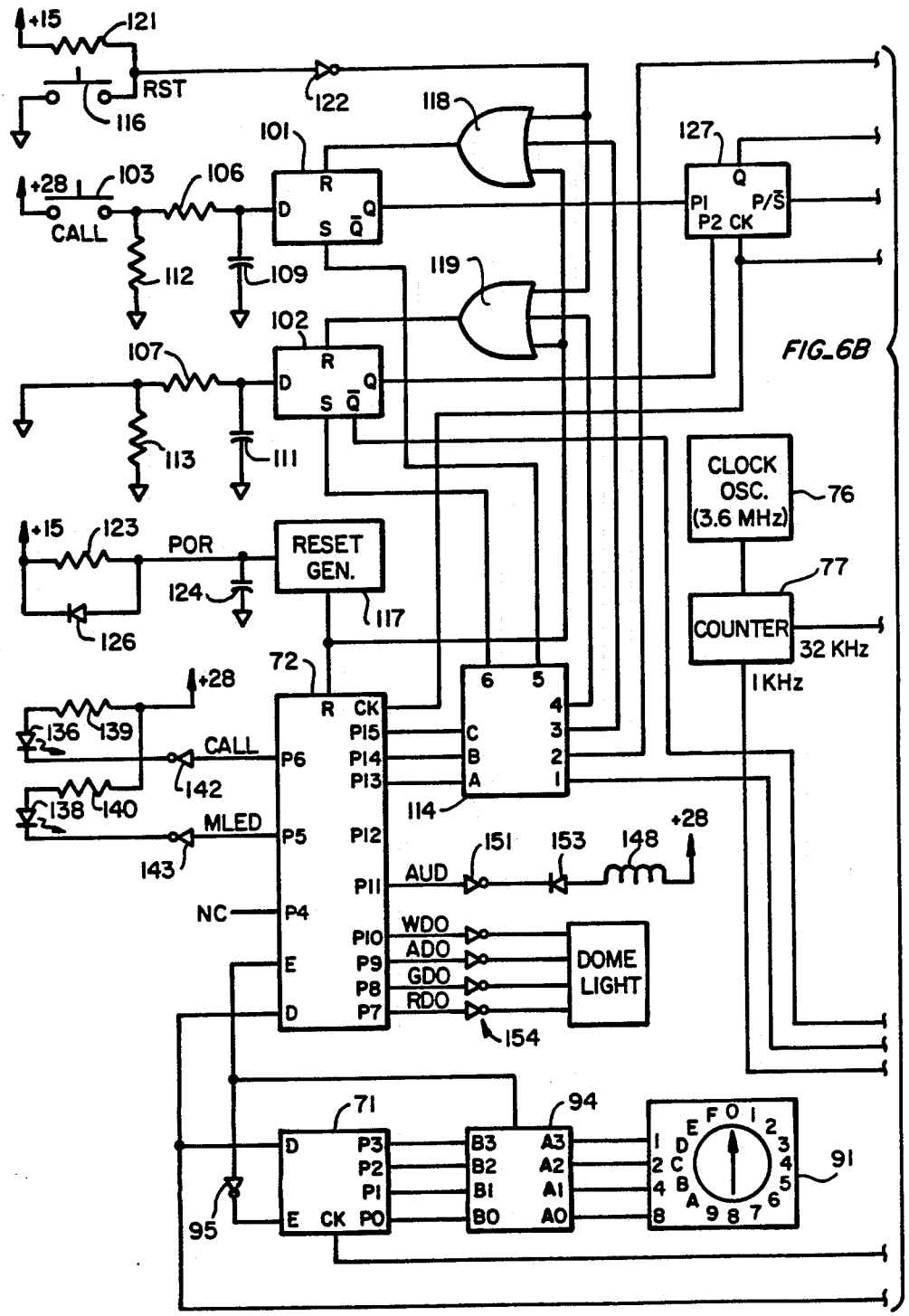
FIG_6A

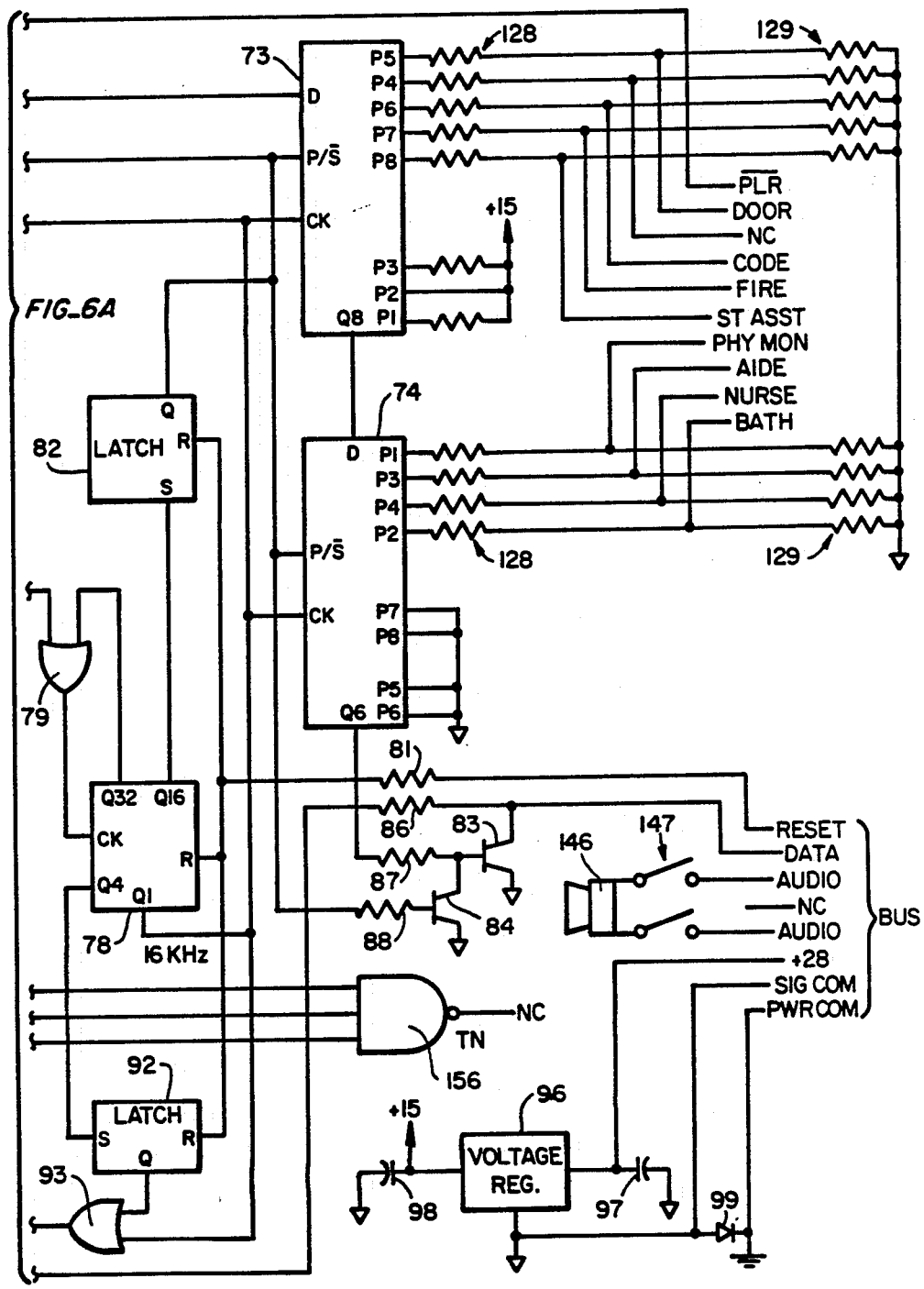
FIG_6B

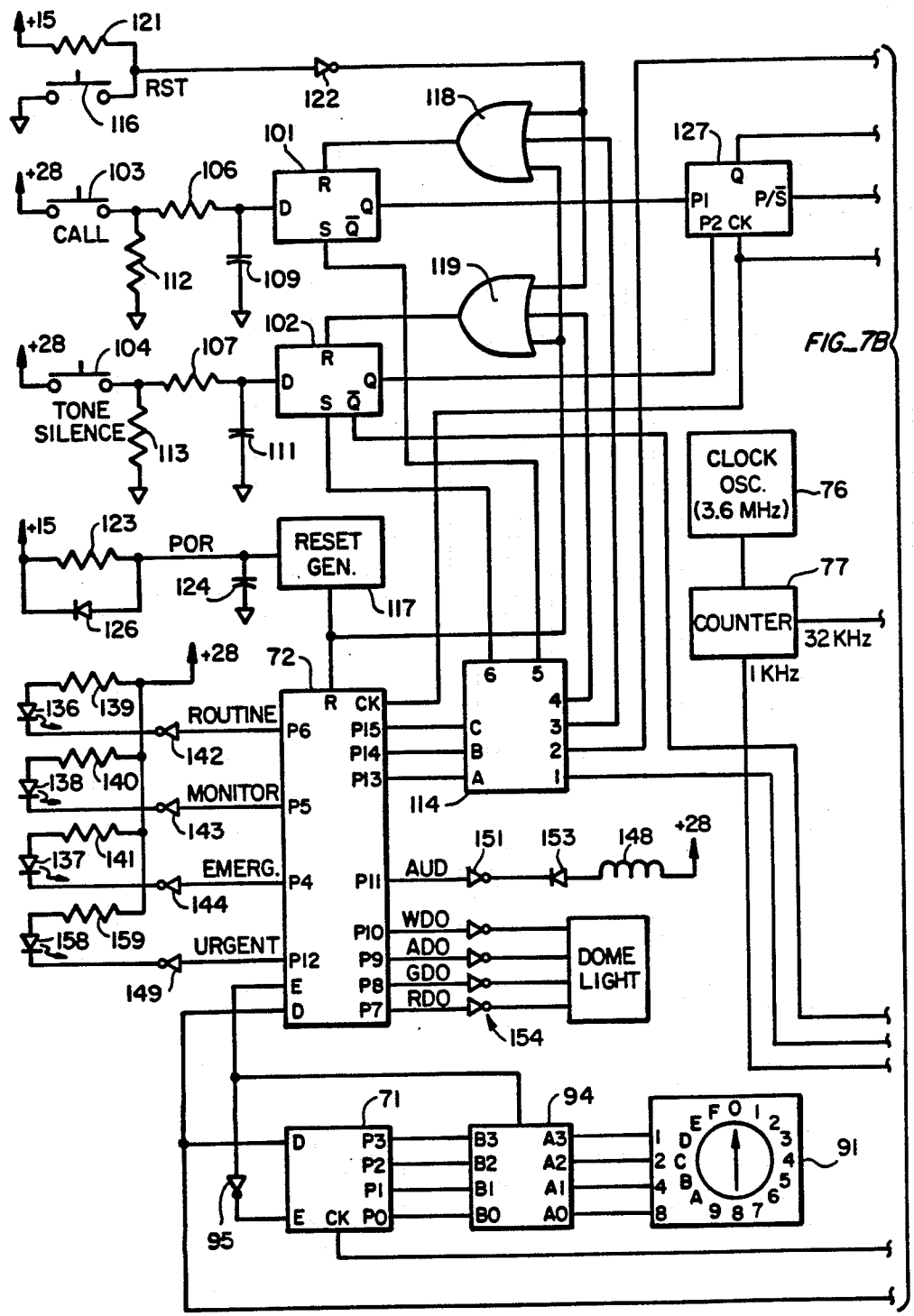
FIG_7A

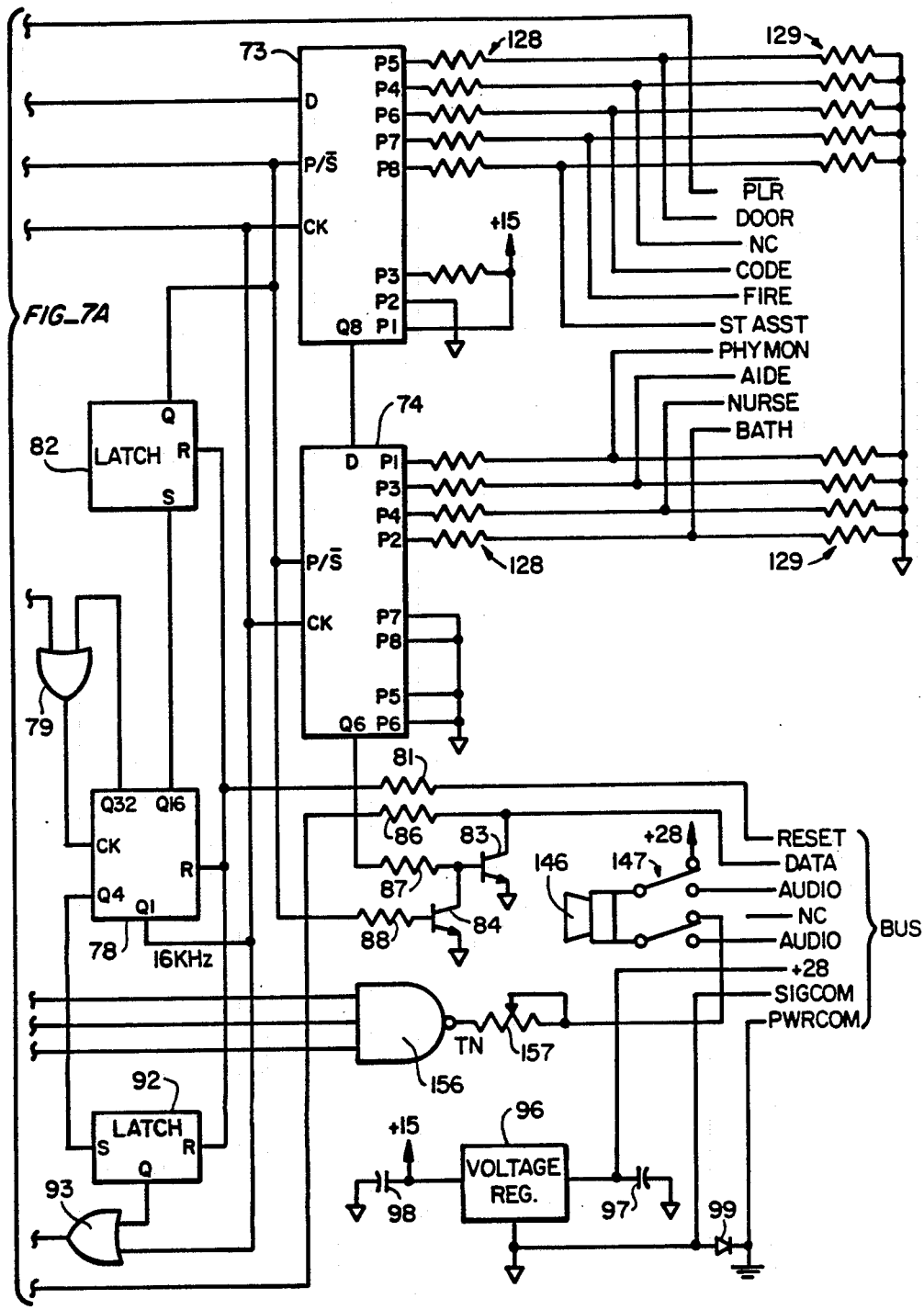
FIG_7B

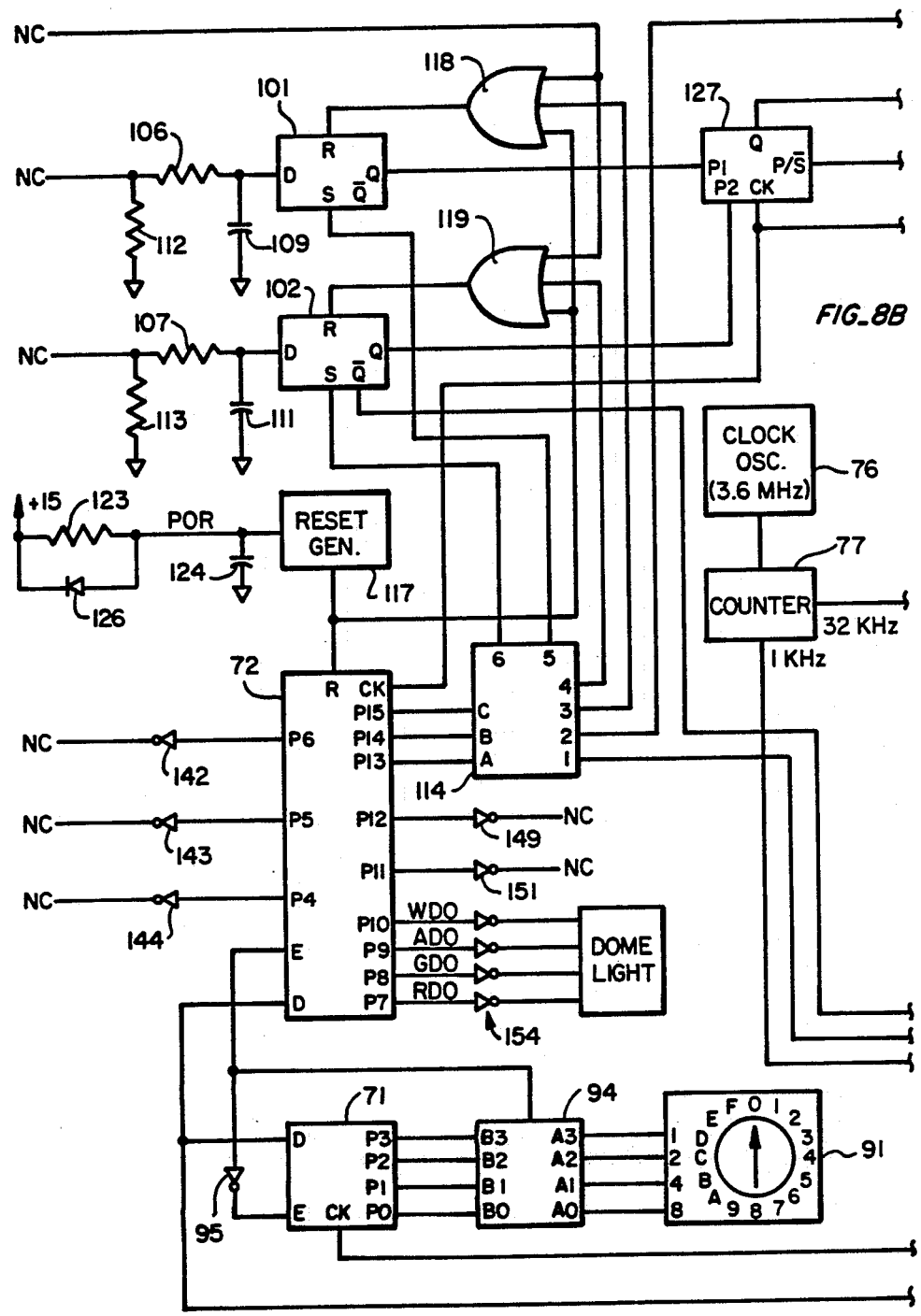
FIG_8B
FIG_8A

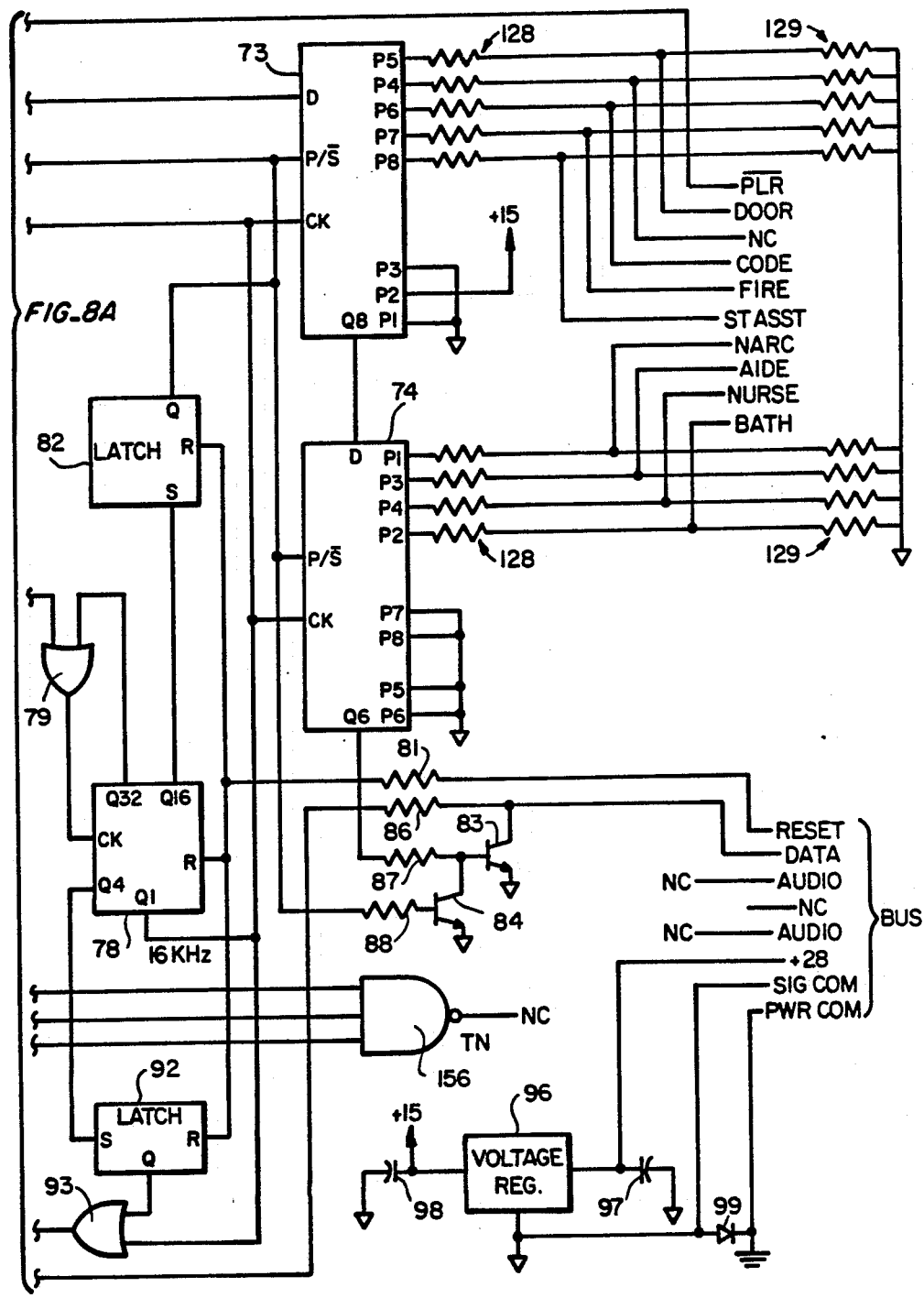
FIG_8B

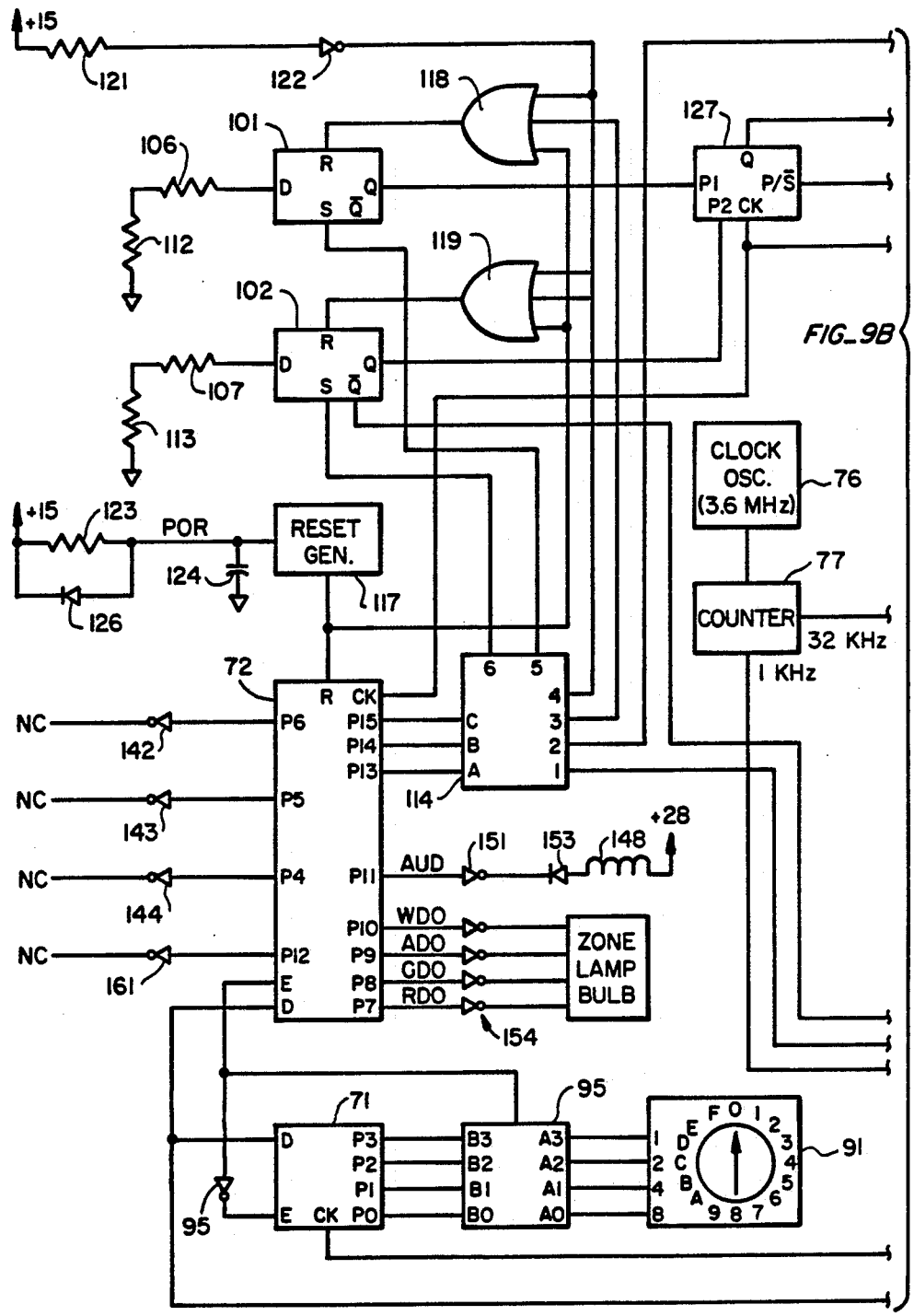
FIG_9A

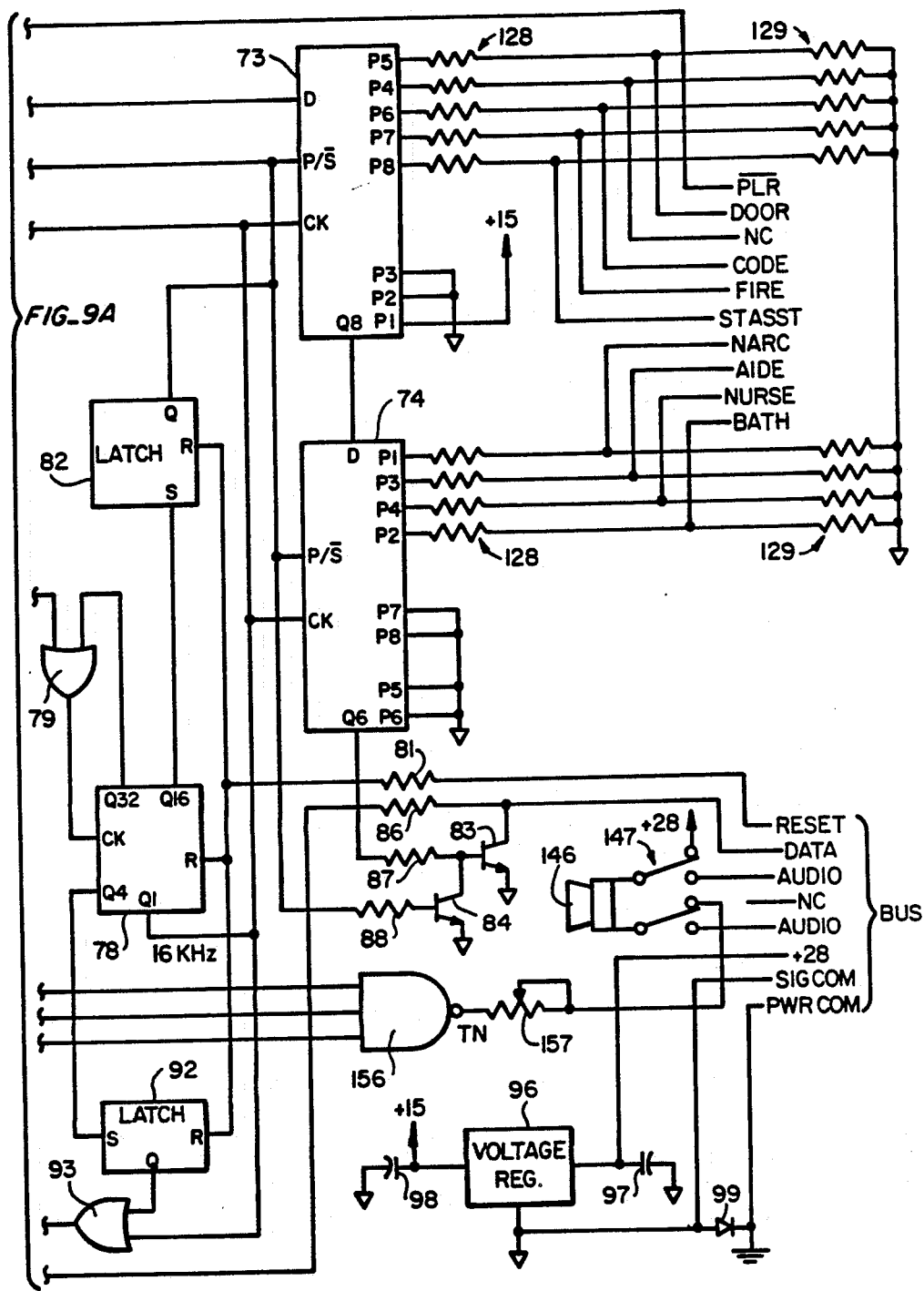
FIG_9B

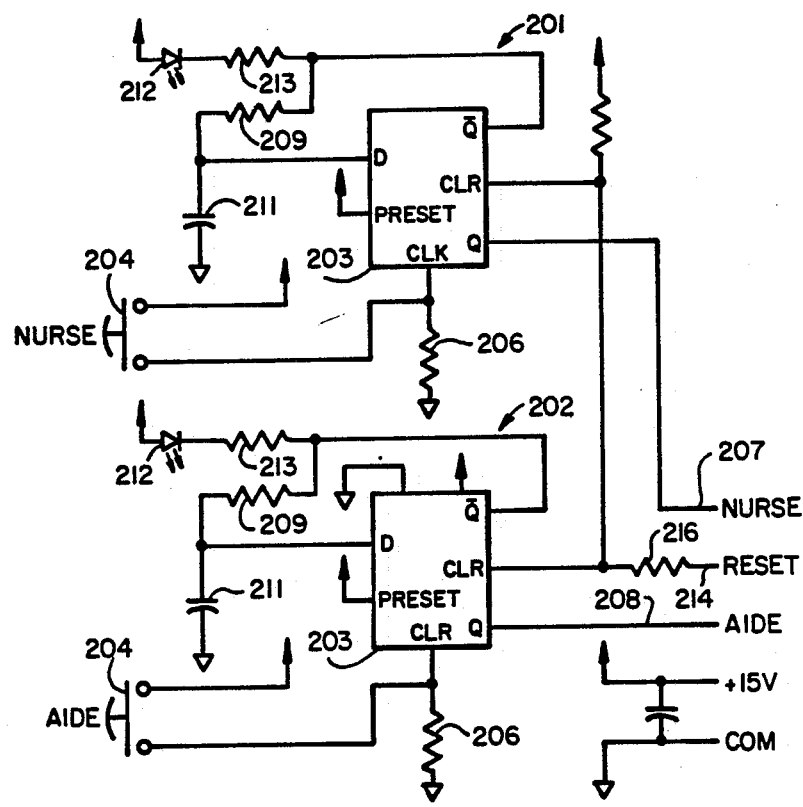
FIG_10
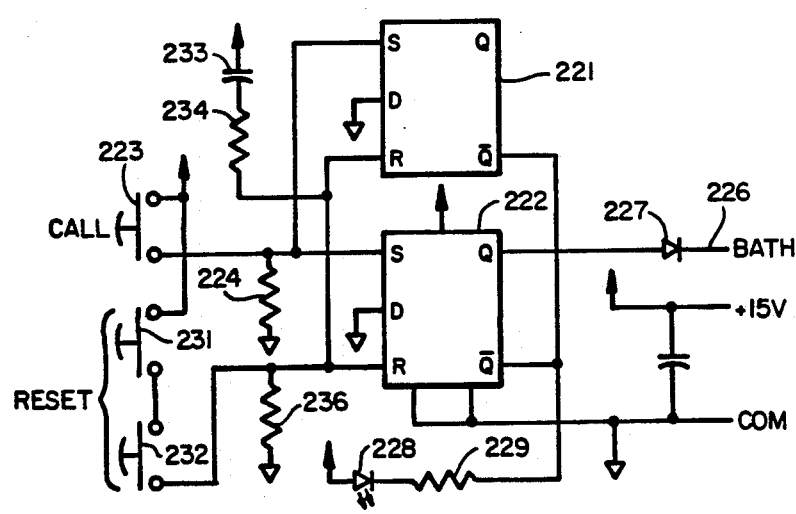
FIG_11

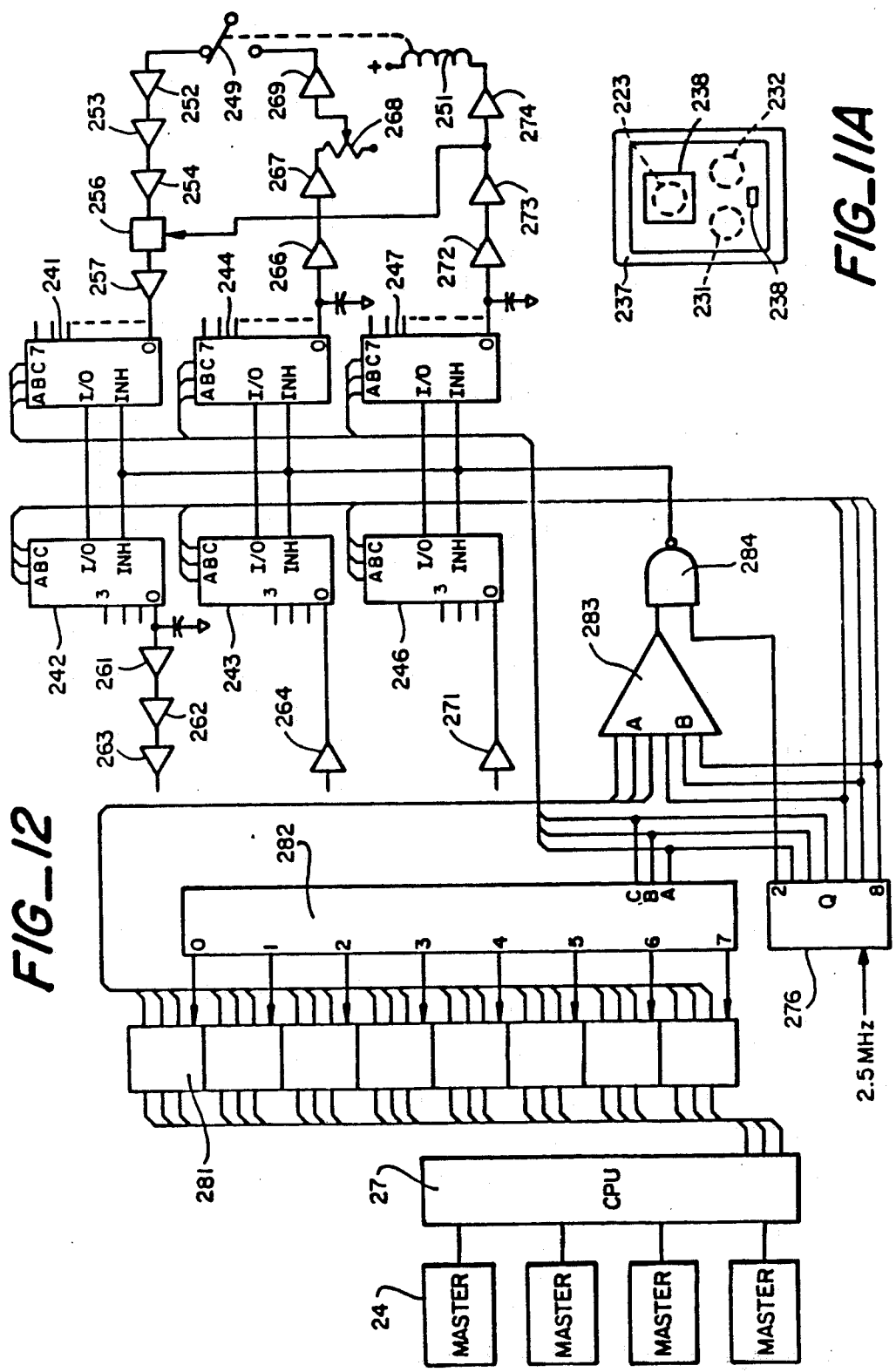

HOSPITAL SIGNALING AND COMMUNICATIONS SYSTEM

This invention pertains to a signaling and communications system for use in a hospital.

BRIEF DESCRIPTION OF THE DRAWINGS

FIG. 1 is an overall block diagram of one embodiment of a hospital signaling and communications system according to the invention.

FIG. 2 is a hospital floor plan illustrating typical locations of different stations and peripheral devices in the system of FIG. 1.

FIG. 3 is an isometric view of one embodiment of a master station console for use in the system of FIG. 1.

FIG. 4 is a timing diagram illustrating the manner in which data is transmitted and received in the system of FIG. 1.

FIGS. 5a, 5b-9a, 9b are circuit diagrams, partially in block form, of remote stations for use in the system of FIG. 1.

FIGS. 10 and 11 are block diagrams of peripheral signaling devices for use in the system of FIG. 1.

FIG. 11a illustrates the front panel of the signaling device of FIG. 11.

FIG. 12 is a block diagram of one embodiment of a pulse amplitude modulated analog switch for use in the system of FIG. 1.

DETAILED DESCRIPTION

As illustrated in FIG. 1, the hospital signaling and communications system includes a central station 16, a plurality of buses 0-7 which extend about the hospital from the central station, a plurality of remote stations 18-22 which transmit and receive data and audio signals over the buses, and a plurality of master stations 24 which communicate with the remote stations through the central station.

The central station includes a power supply 26, a microprocessor 27, an input/output controller 28 for the buses, and an input/output controller 29 for the master stations.

In the embodiment illustrated, up to eight buses can be provided, up to sixteen remote stations can be connected to each of the buses, and an unlimited number of peripheral devices can be connected to the remote stations. As discussed more fully hereinafter, each of the buses comprises eight conductors arranged in four twisted pairs. Each bus has one data line, two audio lines, a reset line, a common line for data and audio signals, a power supply line, a common line for the power supply, and one unused line.

The remote stations are connected in parallel to the buses. FIG. 1 shows a few remote stations with peripheral devices connected to one of the buses for purposes of illustration. It is to be understood, however, that a much larger number of stations and peripheral devices will be employed in an actual installation and that they will be distributed among the buses. Remote station 18 is a patient room station to which a toilet switch 31, a shower switch 32, an emergency code switch 33, a staff presence switch 34 and a staff assistance switch 36 are connected. These peripheral devices apply signals to the room station for transmission over the data line to the central station which transmits them to one or more of the master stations. A dome light 37 is also connected to room station 18. The dome light is mounted in the corridor outside the room, and it has a plurality of colored lights which are illuminated to indicate the type of call which has been placed through the station. One or more stations is provided in each patient room of the hospital, and patient stations can accommodate up to two beds. In rooms having more than two beds, e.g. four or eight bed wards, one station is provided for every two beds.

Toilet switch 31 is mounted in the bathroom near the toilet, and it is used by a patient to summon aid in that room.

Shower switch 32 is located where it can be actuated by a patient in the shower to summon aid. A waterproof switch which can be mounted directly on a wall of the shower and is particularly suitable for use in this system is disclosed in Ser. No. 861,223, now U.S. Pat. No. 4,728,928, filed of even date.

Emergency code switch 33 is used by the staff to signal the occurrence of an emergency situation such as a life threatening situation. A code call takes priority over other calls in the system. Emergency code switches are intended to be located in patient rooms, ward toilet rooms and other rooms where patient emergency conditions may arise.

Staff assistance switch 34 is another switch used by the staff to summon aid in situations which are more urgent than routine patient calls, but not as urgent as emergency calls. Staff assistance switches are typically employed in examination rooms, treatment rooms, therapy areas, and patient rooms in medium to high risk areas.

Staff presence switch 36 is positioned near the door of the room, and it is actuated by personnel as they enter and leave the room to signal their presence in the room.

Station 19 is a staff station to which an emergency code switch 38, a staff presence switch 39 and a staff assistance switch 41 are connected. A dome light 42 is also connected to the staff station. The staff station is employed in areas of the hospital which are used by the staff, such as kitchens, supply areas, examination rooms, conference rooms and offices. These stations can also be used by ambulatory patients in areas such as solariums and day rooms, and in other areas where two-way communication with a master station is required.

Station 20 is a duty station to which a staff presence switch 43 and a dome light 44 are connected. Duty stations are used primarily in utility rooms, lounges, on-call rooms and other places where staff members need to know the presence of a call in the system.

Station 21 is an area control station to which an exit door switch 46 and a smoke detector 47 are connected. A dome light 48 is also connected to the control station. A control station is employed in areas where stand-alone toilet, shower, staff assistance and emergency code switches are required and in other areas where voice communication is not normally required.

Station 22 is a zone lamp station which has a plurality of colored lamps which are illuminated to indicate the presence and nature of a call in another part of the hospital. This station can be programmed to annunciate calls with prioritized tones as well as lamps. Zone lamps are intended to be used in halls or corridors where all of the corridor dome lights cannot be viewed. In a nursing area with an L-shaped floor plan, for example, a zone lamp can be installed at the midpoint of each leg of the floor, with the zone lamp in each leg indicating calls from the other.

FIG. 2 illustrates typical locations of some of the stations and peripheral devices in a hospital. A master station 24 is located at the nurses' desk, and the central station 16 is located in a utility room. Patient station 18 is located in a patient room, and bath switch 31 and shower switch 32 are located near the toilet and in the shower in the bathroom. Code switch 33, staff presence switch 34 and staff assistance switch 36 are located near the door of the room, and dome light is mounted in the corridor outside the room. Staff station 19 is located in a kitchen, and duty station 20 is located in a nurses' lounge. Control station 21 is located in a supply room, and zone lamps 22 are mounted on the ceilings of corridors on opposite sides of the floor.

Each of the master stations 24 is connected to central station 16 by a standard RS-232 serial port, and has a console unit as illustrated in FIG. 3. The console includes a telephone handset 51, a loudspeaker 52 and a microphone for voice communication, and a keypad 53 for calling other stations. It has alphanumeric displays 54 for indicating the origin and type or priority of calls. Incoming calls are annunciated by an audible tone having a repetition rate, frequency and duty ratio determined by the type and priority of the call. Calls are displayed in order according to priority and the order of receipt. The call of highest priority and earliest receipt can be answered automatically by lifting the handset, and any call can be answered directly by pressing a TALK switch 56 next to its display. A call can be cleared by hanging up the handset or pressing the CLEAR button 57 next to the display.

The console has switches 58, 59 for summoning nurses and aides, respectively. Depressing one of these switches while connected to a station causes an appropriate dome lamp to be illuminated at that station to summon the nurse or aide. If desired, the system can have a staff locater function, in which case the location of the three closest nurses or aides will be displayed, and any of these nurses or aides can be called by pressing the TALK switch next to the display. If a nurse or aide is not present in one of the displayed locations, the presence signal from that location can be cleared by depressing the CLEAR switch next to the display.

If another call comes in while the master station is communicating, a brief tone will sound. If the incoming call is of higher priority than a routine call, the tone will continue until the call is answered, a TONE SILENCE switch 61 is pressed, or the call is reset at its origin.

The console also has a STAT switch 62, a STAFF EMERGENCY switch 63, and a CODE switch 64 for upgrading calls from a room in communication with the master or placing such calls to the room.

The console also has switches 66–68 for changing remote station functions or master station functions and executing a test routine.

Data is transmitted over the system in 16-bit packets, as illustrated in FIG. 4. At the outset of each transmitting interval, the control station applies a synchronizing signal to the reset line of each bus to synchronize clocks at the remote stations. The central station first transmits 16 bits of data to one station, then listens for 16 bits of data from that station, then transmits 16 bits of data to the next station, and so on. The first four bits of the data transmitted by the central station contain the address of the remote station which is to receive the data. The data is transmitted at a bit rate on the order of 16 KHz, and each of the possible 128 stations is accessed about four times per second. Audio signals are transmitted and received by the stations during the same time intervals as the data.

FIG. 5 illustrates a patient room station and the manner in which the station is connected to the bus. The station has registers 71, 72 for storing data received from the central station and registers 73, 74 for storing data to be transmitted to the central station. The data in these registers is transmitted and received by the station over the data line in the bus on a time division multiplexing basis.

Operation of the station is controlled by a clock comprising a clock oscillator 76 and counters 77, 78. The clock oscillator operates at a frequency on the order of 3.6 MHz, and counter 77 divides this frequency down to provide clock signals on the order of 32 KHz and 1 KHz. The 32 KHz signal is applied to the clock input of counter 78 through an OR gate 79. The bus reset line is connected to the reset input of counter 78 through a resistor 81, and this counter is reset by the synchronizing pulse transmitted by the control station at the outset of each transmission by the control station. The Q32 output of counter 78 is connected to a second input of OR gate 79 to interrupt the application of clock pulses to the counter when 32 pulses have been counted. Clock pulses at a rate of about 16 KHz are applied to the clock inputs of the registers from the Q1 output of counter 78.

Counter 78 also drives a latch 82 which switches registers 73, 74 between parallel and serial modes for acquiring and transmitting data. The Q16 output of the counter is connected to the set input of the latch, and the synchronizing signal from the bus reset line is applied to the reset input of the latch. The output of the latch is applied to the parallel/serial control inputs of the registers. Registers 73, 74 are thus held in a parallel mode during the first 16 clock pulses following the synchronizing signal, then placed in the serial mode for the next 16 clock pulses.

The direction in which data is transferred between the station and the bus is controlled by transistors 83, 84. The bus data line is connected directly to the data inputs of registers 71, 72 by a resistor 86. Registers 73, 74 are connected in series, and the output (Q6) of register 74 is connected to the base of transistor 83 by a resistor 87. The control signal from latch 82 is applied to the base of transistor 84 through a resistor 88. The collector of transistor 83 is connected to the data line, and the collector of transistor 84 is connected to the base of transistor 83. During the first 16 clock pulses following the reset signal, transistor 84 is turned on, grounding the base of transistor 83 and preventing the delivery of data from registers 73, 74 to the data line. During these 16 clock pulses, data from the data line passes to registers 71, 72. During the next 16 clock pulses, transistor 84 is turned off, and transistor 83 applies the data from registers 73, 74 to the data line. During these 16 clock pulses, the data on the data line is ignored by registers 71, 72 since it originates with the local station.

An address code for the station is provided by a binary coded switch 91. This switch can be set to provide any desired address between 0000 and 1111 for the station. The switch is set so that the station will have a different address than other stations connected to the same bus. Means is provided for comparing the address code generated by switch 91 with the address code transmitted by the central station at the outset of each transmission by the central station. This means includes a latch 92 and an OR gate 93 which cause the first four bits of the transmitted data, i.e. the address information, to be clocked into register 71. The 16 KHz clock signal is applied to the clock input of register 71 through the OR gate, and the passage of the clock signal through the OR gate is controlled by latch 92. The latch is reset by the synchronizing signal from the bus reset line, and the Q4 output of counter 78 is applied to the set input of the latch. The output of the latch is applied to an input of gate 93. During the first four clock pulses of the transmission, the latch is in its reset state, and the clock pulses pass through the OR gate to register 71. Thereafter, the latch is set, and the passage of further pulses is inhibited. The address stored in register 71 is compared with the address from switch 91 by a comparator 94. The output of this comparator is connected to the enable input of register 72 to permit the data from the data line to be read into this register when the station address matches the transmitted address. An inverter 95 connected between the output of the comparator and the enable input of register 71 prevents further data from being read into this register. Thus, the first four bits received from the data line are read into register 71, and the next twelve bits are read into register 72.

An operating voltage of 15 volts is provided by a voltage regulator 96 connected to the +28 volt supply line in the bus. The regulator has an input capacitor 97 and an output capacitor 98, and the common terminal of the regulator is connected to the common signal line in the bus. A diode 99 is connected between the signal common line and the common line for the power supply to prevent the signal common from rising more than about 0.8 volt above the power common, as might otherwise happen with heavy loads.

The station also has a pair of call latches 101, 102, with switches 103, 104 by which patients can make calls to summon aid. These switches are normally open pushbutton switches which are connected between the +28 volt supply line and the D inputs of the latches. These switches are typically mounted in hand-held units which the patient can have in bed with him. Current limiting resistors 106, 107 are connected in series with the switches to prevent damage to the latches by static discharges which can occur when the patients or the cords rub against the bed sheets. Bypass capacitors 109, 111 are connected to the D inputs, and pull-down resistors 112, 113 maintain the latch inputs at a low level when the switches are open.

Latches 101, 102 can also be set by the central station in response to a command from the master station. The data at the P13-P15 outputs of register 72 is decoded by a decoder 114, and two of the decoded data bits are applied to set inputs of the respective latches.

Latches 101, 102 can be reset by a reset switch 116, or by a power-on reset circuit 117, or by the control station. The reset signals are applied to the reset inputs of the latches through OR gates 118, 119.

Reset switch 116 is a normally open pushbutton switch which is mounted on the front panel of the station. This switch is connected in series with a resistor 121 between the +15 volt supply line and the signal common line. The normally high output of the switch is inverted by an inverter 122 and applied to one input of each of the OR gates 118, 119.

The input of power-on reset generator 117 is connected to the junction of a resistor 123 and a capacitor 124 which are connected in series between the +15 volt supply line and the signal common line. A diode 126 is also connected between the generator input and the +15 volt supply line. Output of generator 117 is connected to an input of each of the OR gates 118, 119 and to the reset input of register 72. When power is first applied to the system, capacitor 124 charges toward the +15 volt supply line voltage, triggering the circuit to reset the latches and the register.

Two of the outputs of decoder 114 are also applied to OR gates 118, 119 to permit the latches to be reset by the control station under the control of a master station.

The outputs of latches 101, 102 are applied to the inputs P1, P2 of a register 127. This register receives the 16 KHz clock pulses from counter 78 and the parallel/-serial control signal from latch 82. The output of register 127 is applied to the data input of register 73.

Light emitting diodes 136-138 are driven by output lines P4-P6 of register 72 to indicate when calls have been placed through latches 101, 102 and when the station is being monitored. These LED's are mounted on the front panel of the station module and visible in the room. LED 136 indicates the presence of a call through latch 101, LED 137 indicates the presence of a call through latch 102, and LED 138 indicates that the station is being monitored. The LED's are connected to the +28 volt supply line by current limiting resistors 139-141, and they are driven by drivers 142-144, respectively.

Peripheral devices are connected to the inputs of registers 73, 74 through resistors 128, with pull-down resistors 129 holding these inputs low in the absence of signals from the devices. In the embodiment illustrated, PATIENT UP switches are connected to the P4 and P5 inputs of register 73 to indicate when the patients are not in their beds. An emergency code switch and a smoke detector are connected to lines P6 and P7, and a staff assistance call switch is connected to line P8 of this register. A physiological monitoring device such as an EKG monitor is connected to the P1 line of register 74, and the outputs of a staff presence switch are connected to lines P3 and P4 of this register. A signal ($\overline{PLR}$) for resetting the staff presence switch is provided by one of the outputs of decoder 114. A toilet switch and a shower switch are connected to the P2 line of register 74. The P7 and P8 lines of register 74 are connected to the signal common, and the call latch data from register 127 is read through registers 73, 74 in place of the data from the grounded lines.

Lines P1, P2 of register 73 are connected to the signal common line, and line P3 of register 73 is connected to the +15 volt supply line to provide a code which identifies the type of station and tells the central station how to interpret the data received from this station. These three bits are also utilized by the central station to verify that the system is working properly. These three lines are utilized for the same purpose in all of the remote stations, although they are encoded differently for different types of stations. In each case, however, at least one of the lines is high and one of the lines is low, and the central station detects a problem if the data bits it receives from a station are either all high or all low.

The reset signal from reset switch 116 is applied to the P5 and P6 lines of register 74 by diodes 131, 132. These lines are normally held high by pull-up resistors 133, 134.

Audio signals from the twisted pair of audio lines in the bus are applied to a loudspeaker 146 through relay contacts 147. These contacts are controlled by a relay coil 148 which is driven by outputs P11, P12 of register 72 through drivers 149, 151 and diodes 152, 153.

A corridor dome light is driven by output lines P7-P10 of register 72 through lamp drivers 154.

Although it is not utilized in a patient station, means is provided for generating a tone signal. This means includes a NAND gate 156 to which the 1 KHz output of counter 77 is connected. The $\overline{Q}$ output of latch 102 is connected to a second input of the NAND gate, and one of the outputs of decoder 114 is connected to a third input of the NAND gate. No connection to the output of the NAND gate is made in a patient station. However, the same logic circuitry is employed in other stations where the tone is utilized.

FIG. 6 illustrates a staff station which is generally similar to the patient station of FIG. 5, and like reference numerals designate corresponding elements in the two figures. The staff station employs the same logic circuitry as the patient station, and it operates in a similar manner. The staff station has only a single call switch 103 and a single LED 136 for indicating that a call has been placed. The input to call latch 102 is grounded to the signal common line, and no connection is made to output line P4 of register 72.

A door switch is connected to input line P5 of register 73 to indicate when an exit door is opened, and no connection is made to input line P4 of this register. The P1-P3 input lines of register 73 are encoded to identify the station as a staff station, and input lines P5, P6 of register 74 are grounded to the signal common line.

FIG. 7 illustrates a duty station which employs the same logic circuitry as the patient station of FIG. 5, and like reference numerals designate corresponding elements in the two figures. In the duty station, the tone signal from NAND gate 156 is applied to loudspeaker 146 through a level control 157 and a normally closed set of contacts on relay 147 to annunciate the receipt of a call. The tone can be silenced by means of switch 104, and even though the tone is silenced, the signal applied to NAND gate 156 by decoder 114 provides a small tone to indicate the presence of additional calls.

In the duty station, LED 136 indicates the presence of a routine call, and LED 137 indicates the presence of an emergency call. An additional LED 158 is driven by output line P12 of register 72 to indicate an urgent call. The anode of this LED is connected to the +28 volt supply line by a current limiting resistor 159, and the cathode is connected to the output of driver 149 connected to line P12.

The duty station is similar to the staff station illustrated in FIG. 6 in that a door switch is connected to the P5 input line of register 73 and no connection is made to the P4 input line of this register. The P1-P3 input lines are encoded to indicate a duty station, and lines P5, P6 of register 74 are grounded to the signal common line.

The station illustrated in FIG. 8 is an area control station which uses the same logic circuitry as the patient station illustrated in FIG. 5. Corresponding reference numerals designate like elements in the figures. In the area control station, there are no call switches and no LED's to indicate the presence of calls. Lines P1-P3 of register 73 are encoded to indicate an area control station, and a narcotics cabinet door switch is connected to the P1 input line of register 74 to provide an indication when the door is open. No connection is made to the twisted pair of audio conductors in the bus since there is no audio communication with this type of station.

FIG. 9 illustrates a zone lamp station which uses the same logic circuitry as the patient station of FIG. 5, and like reference numerals designate corresponding elements in the two figures. This station has a tone function similar to the duty station of FIG. 7. This station differs from the duty station, however, in that no switch is provided for silencing the tone from the zone lamp station. It has no call switches or LED indicators, and there is no provision for a dome lamp. Drivers 154 drive the bulbs in the zone lamp itself. The P1-P3 input lines of register 73 are encoded to indicate that the station is a zone lamp, and narcotic door switch is connected to the P1 input line of register 74, as in the area control station of FIG. 8.

FIG. 10 illustrates a staff presence switch which can be connected to any of the stations illustrated in FIGS. 5-9. This device has two identical sections 201, 202, one for nurses and one for aides. Each section comprises a latch circuit having a D-type flip-flop 203 and a manually operable switch 204 for toggling the latch circuit between rest and signaling output states. In one presently preferred embodiment, the presence switch is mounted in a standard electrical switch box, and switches 203 are membrane switches mounted on a plate or panel which covers the box. One terminal of each switch is connected to the +15 volt supply line, and the other terminal is connected to the clock input of the flip-flop. A pull-down resistor 206 is also connected to the clock input.

The Q outputs of the two flip-flops are connected to output terminals 207, 208, respectively, and the $\overline{Q}$ output of each flip-flop is connected to the D input by an RC circuit comprising a resistor 209 and a capacitor 211. A LED 212 and a resistor 213 are connected in series between the +15 volt supply line and the $\overline{Q}$ output of each flip-flop. The LED's are visible through windows in the panel on which the switches are mounted.

The CLEAR inputs of the two flip-flops are connected together and to an input terminal 214 by a resistor 216. A pull-up resistor 217 is connected between the CLEAR inputs and the +15 volt supply line.

When a nurse or aide enters the room or other area where the presence switch is located, she registers in by pressing the appropriate one of switches 204. This switches the latch from the standby or rest state to the active output state, delivering an output signal to output terminal 207 or 208. At the same time, the $\overline{Q}$ output is driven low, turning on LED 212. The D input of each flip-flop follows the $\overline{Q}$ output, and this causes the latch to toggle between its output states in response to successive clock pulses. The delay provided by the RC circuit prevents bouncing of the switch contacts from changing the output state. When the nurse or aide leaves the room, she again presses the appropriate switch, and the latch circuit returns to its rest state, turning off the output signal and the LED. If the nurse or aide forgets to register out, the latch circuit can be reset from the master station by pressing the appropriate CLEAR switch 56 to apply a reset signal to the clock input of the flip-flop.

The circuit illustrated in FIG. 11 can be connected to any of the stations illustrated in FIGS. 5-9 and utilized as an emergency code switch, a staff assistance switch or a toilet switch. This circuit comprises a pair of D-type latches 221, 222 with a manually operable switch 223 having one terminal connected to the +15 volt supply line and a second terminal connected to the set inputs of the two latches. A pull-down resistor 224 is connected between the set inputs and ground. The Q output of latch 222 is connected to an output terminal 226 by a diode 227, and an LED 228 and a resistor 229 are connected in series between the +15 volt supply line and the $\overline{Q}$ outputs of the latches. The D inputs of the latches are grounded.

A pair of reset switches 231, 232 are connected electrically in series between the +15 volt supply line and the reset inputs of the latches. A capacitor 233 and a resistor 234 are also connected between the +15 volt supply line and the reset inputs, and a pull-down resistor 236 is connected between the reset inputs and ground.

In one presently preferred embodiment, illustrated in FIG. 11a, call switch 223 and reset switches 231, 232 are membrane switches mounted on the panel or cover plate of a standard electrical switch box in which the circuit of FIG. 11 is mounted. Switch 223 is located behind an area of the membrane surface which is labeled with an appropriate legend such as "PRESS FOR HELP", "CODE" or "STAFF ASSIST". The reset switches are located behind unmarked areas of the membrane surface, and LED 228 is visible through a window in the panel.

The latch circuit of FIG. 11 is normally in an "off" or rest state. When switch 223 is closed, latches 221, 222 are both set to their active states with the Q output of latch 222 going high and delivering an output signal to output terminal 226. At the same time, the $\overline{Q}$ outputs of the latches go low, turning on LED 228 to indicate that a call has been placed. The latch circuit can only be returned to its rest state by pressing the two unlabeled reset switches 231, 232 simultaneously. This prevents a confused patient or staff member from resetting the circuit accidentally in the event of an emergency.

The pulse amplitude modulated switching circuit illustrated in FIG. 12 controls the transmission of audio signals between the master stations and the remote stations. This circuit includes a first pair of multiplexers 241, 242 which control the passage of audio signals from the remote stations to the master stations, a second pair of multiplexers 243, 244 which control the passage of audio signals from the master stations to the remote stations, and a third pair of multiplexers 246, 247 which route talk/listen control signals in accordance with the selected master and remote stations. Multiplexer 241 has an input line for each of the eight buses and an output line connected to the input line of multiplexer 242. Multiplexer 242 has an output line for each of the four master stations. Multiplexers 243, 246 each have one input line for each of the four master stations and an output line which is connected to the respective input line of multiplexers 244, 247. Multiplexers 244, 247 each have an output line for each of the eight buses.

The direction in which audio signals are transmitted over each of the buses is controlled by a talk/listen or transmit/receive switch 249. Although shown as a single-pole switch for convenience of illustration, this switch is actually a two-pole switch actuated by a coil 251. The two poles are connected to the two wires in the twisted pair of audio conductors in the bus, one such switch being provided for each of the buses.

Each of the input channels to multiplexer 241 includes a preamplifier 252, a bandpass filter 253, a compander 254, an analog switch 256, and a bandpass filter 257. The preamplifier is a differential instrumentation amplifier which converts the balanced signal from the twisted pair in the bus to a single-ended signal. Filters 253, 257 are second order bandpass filters which limit the bandwidth of the signal applied to the multiplexer to about 4 KHz, and the compander limits the dynamic range of this signal. Analog switch 256 controls the passage of the signal to the multiplexer.

Each output channel of multiplexer 242 includes a sample and hold amplifier 261, a filter 262 and a line amplifier 263. The sample and hold circuit captures each segment of the audio signal which passes through multiplexers 241, 242, and this segment is applied to the master station until the next segment is received for that station. Filter 262 smooths the signal from the sample and hold circuit.

Each input channel to multiplexer 243 includes an amplifier 264, and each output channel from multiplexer 244 includes a sample and hold amplifier 266, a filter 267, a level control 268 and a power amplifier 269. Sample and hold circuit 266 holds each segment of the audio signal from multiplexer 244 until the next signal arrives, and filter 267 smooths the signal from the sample and hold circuit. Amplifier 269 has a balanced output and a power rating on the order of 2-5 watts. Level control 268 permits the level of the audio signals applied to each bus to be individually adjusted.

Each of the input channels of multiplexer 246 has an amplifier 271, and each of the output channels of multiplexer 247 has amplifiers/drivers 272-274 for driving analog switch 256 and switch coil 251.

Address signals are applied to the multiplexers by a counter 276. The counter is driven by a 2.5 MHz clock signal. The three most significant output bits (Q6-Q8) of the counter are applied to the address inputs of multiplexers 242, 243 and 246 to control the master station selection. Three output bits of lesser significance (Q3-Q5) are applied to the address inputs of multiplexers 241, 244 and 247 to control the bus selection. With this arrangement, the master stations are selected in sequence, and each of the buses is selected during the time that each master station is selected. Each of the master stations is thus able to communicate with the stations connected to each of the buses.

The master stations select the stations connected to the buses with which they wish to communicate and request connection by the central station. The addresses of the master stations to be connected to the respective buses are stored in bus latches 281. A bus latch selector consisting of a decoder 282 receives the address of the currently selected bus from counter 276 and enables the latch for this bus to deliver the master station address to a comparator 283. Comparator 283 also receives the current master station address from counter 276. When the current address matches the desired address, the comparator delivers a high output signal to one input of a NAND gate 284. The NAND gate receives a second input from a counter output bit (Q2) of lesser significance than the bits used for addressing the multiplexers. The output of the NAND gate is connected to the inhibit inputs of the multiplexers. This output is normally high, inhibiting the passage of signals through the multiplexers at all times except the brief interval when the proper master station is being addressed and counter output bit Q2 is high. This provides the desired connections between the master stations and the buses so that the audio signals will be transmitted only between the desired stations. It also provides a temporal separation between successive signals and avoids cross-talk between these signals.

It is apparent from the foregoing that a new and improved hospital signaling and communications system has been provided. While only certain presently preferred embodiments have been described in detail, as will be apparent to those familiar with the art, certain changes and modifications can be made without departing from the scope of the invention as defined by the following claims.

I claim:

1. In a hospital signaling and communications system: a bus having separate data and twisted pair low frequency audio lines extending about the hospital, a central station including a central audio power amplifier, said central station being connected to the bus for transmitting and receiving data and audio signals over the separate data and audio lines, a plurality of remote stations having unique address codes connected to the bus at different locations within the hospital for transmitting and receiving data and audio signals over the separate data and audio lines whereby amplified audio signals are received at the remote stations and unamplified audio signals are transmitted by the remote stations, a master station connected to the central station for communicating with the remote stations through the central station, means at the central station for transmitting address codes for the remote stations over the data line in a serial sequence, means responsive to the address codes at each of the remote stations for enabling the station whose address code is transmitted to receive and transmit data and audio signals over the separate data and audio lines for a predetermined interval of time by time division multiplexing after the address code is transmitted, a plurality of peripheral devices including a call switch for summoning aid connected to the remote stations, means at the remote stations responsive to data signals from the central station for controlling operation of at least some of the peripheral devices, means at the remote stations for storing data from at least some of the peripheral devices for transmission to the central station, and means operable from the remote stations and in response to signals from the central station for clearing data from the storage means.

2. The system of claim 1 wherein the data is transmitted and received in packets containing a predetermined number of data bits.

3. The system of claim 1 wherein a plurality of master stations are connected to the central station for communication with the remote stations.

4. The system of claim 1 wherein a plurality of buses having data and audio lines are provided, and the central station includes means for interconnecting the master station with successive ones of the buses during successive transmitting and receiving intervals.

5. The system of claim 1 wherein the peripheral devices include a corridor dome light.

6. The system of claim 1 wherein one of the peripheral devices comprises a staff presence switch having a latch circuit and manually operable switch means for setting the latch circuit in a signaling state and resetting the latch circuit in a rest state, and the central station includes means for transmitting a signal over the data line to the receiving station to which the staff presence switch is connected for resetting the latch circuit to the rest state in response to a command from the master station.

7. The system of claim 1 wherein one of the peripheral devices includes a latch circuit, manually operable switch means for setting the latch circuit in a signaling state, and a pair of unmarked switches which must be actuated simultaneously to reset the latch circuit from the signaling state to a non-signaling state.

8. The system of claim 1 wherein the master station includes means for initiating call signals and instructing the central station to transmit the call signals to the remote stations.

9. The system of claim 1 including output devices connected to the remote stations, and means at the remote stations for storing signals received from the central station for actuating the output devices.

10. The system of claim 9 wherein the output devices include means for generating audible calling tones.

11. In a hospital communications system: a plurality of buses having audio lines extending about the hospital, a plurality of master stations for transmitting and receiving audio signals over the audio lines and for providing control signals for controlling the direction in which signals are transmitted and received over the audio lines, a remote station connected to the audio lines in each of the buses for receiving audio signals from the master stations and transmitting audio signals to the master stations, a first pair of multiplexers for passing audio signals from a selected one of the buses to a selected one of the master stations, a second pair of multiplexers for passing audio signals from a selected one of the master stations to a selected one of the buses, switching means for selectively connecting the first or second pair of multiplexers to the buses, a third pair of multiplexers for passing the control signals from a selected one of the master stations to the switching means for a selected one of the buses, means for applying address signals to the multiplexers to address the master stations and the buses in a predetermined sequence, and means for enabling the multiplexers to pass the audio signals when a desired master station and a desired bus are both addressed.

12. The system of claim 11 wherein one of the multiplexers in each pair selects the master station and the other multiplexer in each pair selects the bus, and the means for applying address signals comprises a counter having output bits of greater significance connected to the multiplexers for selecting the master station and output bits of lesser significance connected to the multiplexers for selecting the bus.

13. The system of claim 12 including means connected to the multiplexers and responsive to a counter output bit of lesser significance than the address bits for inhibiting the passage of each signal through the multiplexers for a predetermined time to provide temporal separation between successive signals.

14. The system of claim 11 wherein the means for enabling the multiplexers to pass the signals includes means for storing the address of the master station to be connected to each bus, means for comparing the master station address stored for each bus addressed with the current master station address, and means for applying an enabling signal to the multiplexers when the stored address matches the current address.

15. The system of claim 11 including sample and hold circuits connected between the first pair of multiplexers and each of the master stations and between the second pair of multiplexers and each of the buses for sampling and holding signals passed by the respective pairs of multiplexers, the signals held by the sample and hold circuits being applied to the respective master stations and buses.

16. The system of claim 11 including means for amplifying and filtering the audio signals applied to the first pair of multiplexers from the audio lines in the bus.

17. The system of claim 11 including means for amplifying the signals passed to the master station from the first set of multiplexers.

18. The system of claim 11 including means for amplifying the audio signals passed to the buses from the second set of multiplexers.

19. In a call switch for a hospital signaling and communications system: a latch circuit having rest and signaling output states, a manually operable switch connected to the latch circuit for setting the latch circuit in the signaling state, and two unmarked switches connected electrically in series with a reset input of the latch circuit for resetting the latch circuit to the rest state when the two unmarked switches are actuated simultaneously.

20. In a hospital communications system: a plurality of buses having audio lines extending about the hospital, a master station for transmitting and receiving audio signals over the audio lines, a remote station connected to the audio lines in each of the buses for receiving audio signals from the master station and transmitting audio signals to the master station, a first multiplexer for selectively passing audio signals from the master station to the buses, a second multiplexer for selectively passing audio signals from the buses to the master station, means for applying address signals to the multiplexers to condition the multiplexers to pass the signals for successive ones of the buses in a predetermined sequence, and switching means controlled by the master station for connecting the first multiplexer to the buses during time intervals when audio signals are to be transmitted by the master station and connecting the second multiplexer to the buses during time intervals when audio signals are to be received by the master station.

21. In a hospital communications system: a plurality of buses having audio lines extending about the hospital, a master station for transmitting and receiving audio signals over the audio lines, a remote station connected to the audio lines in each of the buses for receiving audio signals from the master station and transmitting audio signals to the master station, a first multiplexer for selectively passing audio signals from the master station to the buses, a second multiplexer for selectively passing audio signals from the buses to the master station, means for applying address signals to the multiplexers to condition the multiplexers to pass the signals for successive ones of the buses in a predetermined sequence, means for sampling the signals passed by the multiplexers and holding the sampled signals for each bus until the next time signals for that bus are passed, and means for applying the respective sampled and held signals to the buses and to the master station.

22. In a hospital communications system: a plurality of buses having audio lines extending about the hospital, a plurality of master stations for transmitting and receiving audio signals over the audio lines, a remote station connected to the audio lines in each of the buses for receiving audio signals from the master station and transmitting audio signals to the master station, a first multiplexer for selectively passing audio signals from the master station to the buses, a second multiplexer for selectively passing audio signals from the buses to the master station, additional multiplexers for selectively passing audio signals from the master stations to the first multiplexer and for selectively passing the audio signals from the second multiplexer to the master stations, means for applying address signals to the additional multiplexers in a predetermined sequence, means for enabling the multiplexers to pass the audio signals when a desired master station and a desired bus are both addressed, and a counter having its less significant output bits applied to the first and second multiplexers and its more significant output bits applied to the additional multiplexers.

23. The system of claim 22 including means connected to the multiplexers and responsive to a counter output bit of lesser significance than the output bits applied to the address inputs for interrupting the passage of signals through the multiplexers for a time sufficient to prevent cross-talk between successive ones of the audio signals.

24. In a hospital communications system: a plurality of buses having audio lines extending about the hospital, a plurality of master stations for transmitting and receiving audio signals over the audio lines, a remote station connected to the audio lines in each of the buses for receiving audio signals from the master station and transmitting audio signals to the master station, a first multiplexer for selectively passing audio signals from the master station to the buses, a second multiplexer for selectively passing audio signals from the buses to the master station, additional multiplexers for selectively passing audio signals from the master stations to the first multiplexer and for selectively passing the audio signals from the second multiplexer to the master stations, means for applying address signals to the additional multiplexers in a predetermined sequence, means for enabling the multiplexers to pass the audio signals when a desired master station and a desired bus are both addressed, switching means connected between the first and second multiplexers and each of the buses for selectively connecting the multiplexers to the buses, and control signal multiplexers for passing control signals from the selected master station to the switching means for the selected bus.

25. In a hospital signaling and communications system: a bus having separate data and audio lines extending about the hospital, a central station connected to the bus for transmitting and receiving data and audio signals over the separate data and audio lines, a plurality of remote stations having unique address codes connected to the bus at different locations within the hospital for transmitting and receiving data and audio signals over the separate data and audio lines, a master station connected to the central station for communicating with the remote stations through the central station, means at the central station for transmitting address codes for the remote stations over the data line in a serial sequence, means responsive to the address codes at each of the remote stations for enabling the station whose address code is transmitted to receive and transmit data and audio signals over the separate data and audio lines for a predetermined interval of time by time division multiplexing after the address code is transmitted, a plurality of peripheral devices including a staff locator switch connected to the remote stations, means at the remote stations responsive to data signals from the central station for controlling operation of at least some of the peripheral devices, means at the remote stations for storing data from at least some of the peripheral devices for transmission to the central station, and means operable from the remote stations and in response to signals from the central station for clearing data from the storage means.

26. In a facility signaling and communication system, a bus comprised solely of low frequency twisted pair cabling having data and audio lines extending about the facility, a central station connected to the bus for transmitting and receiving data and audio signals over the data and audio lines, a plurality of remote stations having a plurality of functions located at different locations in the facility and connected to said bus for transmitting and receiving data and audio signals over the data and audio lines and a plurality of master stations at the facility connected to the central station whereby each of said master stations is capable of communicating with at least certain of the remote stations, each of said remote stations including circuitry which permits transmission and receiving serial data over the twisted pair cabling, said central station having pulse amplitude modulated power audio switch means controllable from a master station for controlling audio functions at a remote station without the use of amplification at the remote station.

27. A system as in claim 26 wherein said plurality of remote stations is capable of transmitting and receiving data and audio signals in real time over the data and audio lines.

28. A system as in claim 26 wherein one of the functions at the remote station includes means for recognizing a signal sent to it by any other remote station.

29. A system as in claim 26 wherein one of said functions includes means for controlling selected functions at the remote station from the master station.

30. A system as in claim 29 together with means at each of the remote stations for transmitting a request as well as transmitting data from the remote station.

31. A system as in claim 26 together with means for automatically diagnosing when a remote station is not reporting.

* * * * *